(12) United States Patent
Speggiorin

(10) Patent No.: US 7,506,846 B2
(45) Date of Patent: Mar. 24, 2009

(54) FOOT FOR OPTICAL OR PHOTOGRAPHIC SUPPORTS

(75) Inventor: Paolo Speggiorin, Mussolente (IT)

(73) Assignee: Lino Manfrotto + Co. S.p.A., Bassamo del Grappa VI (IT)

( * ) Notice: Subject to any disclaimer, the term of this patent is extended or adjusted under 35 U.S.C. 154(b) by 427 days.

(21) Appl. No.: 10/539,142

(22) PCT Filed: Jan. 21, 2004

(86) PCT No.: PCT/EP2004/000448

§ 371 (c)(1),
(2), (4) Date: Feb. 10, 2006

(87) PCT Pub. No.: WO2004/068024

PCT Pub. Date: Aug. 12, 2004

(65) Prior Publication Data

US 2006/0186286 A1    Aug. 24, 2006

(30) Foreign Application Priority Data

Jan. 30, 2003    (IT)    .......................... PD2003A0020

(51) Int. Cl.
F16M 11/00    (2006.01)
(52) U.S. Cl. ....................................... 248/157; 248/410
(58) Field of Classification Search ................. 248/157, 248/333, 336, 337, 354.1, 408, 409, 412
See application file for complete search history.

(56) References Cited

U.S. PATENT DOCUMENTS

| 2,529,861 | A | * | 11/1950 | Angell et al. | ............... 248/656 |
| 3,807,574 | A | * | 4/1974 | Lanza | ........................ 211/207 |
| 4,073,456 | A | * | 2/1978 | Karapita et al. | ............. 248/337 |
| 4,526,334 | A | * | 7/1985 | Rantakari | .................... 248/157 |
| 7,204,466 | B2 | * | 4/2007 | Hsieh | ......................... 248/410 |
| 2002/0195411 | A1 |  | 12/2002 | Liu |  |

FOREIGN PATENT DOCUMENTS

| DE |   592 023 |   | 1/1934 |
| DE | 17 75 404 | B | 11/1971 |

* cited by examiner

*Primary Examiner*—Gwendolyn Baxter
(74) *Attorney, Agent, or Firm*—RatnerPrestia

(57) ABSTRACT

A foot for optical or photographic supports includes a telescopic rod having several telescopic members and, for each pair of adjacent telescopic members, an expanding stop mechanism mounted on one telescopic member of the pair and acting on the other telescopic member of the pair in order to block their relative sliding motion. The stop mechanism includes a radially expandable ring and an expander body for the ring for pressing the elements of the ring radially against an inner shell of the other telescopic member. The ring includes a plurality of barrel rollers having an outer shell with a curvature coinciding substantially with the curvature of the inner shell of the other telescopic member.

10 Claims, 1 Drawing Sheet

FOOT FOR OPTICAL OR PHOTOGRAPHIC SUPPORTS

This application is a U.S. National Phase Application of PCT International Application PCT/EP2004/000448.

TECHNICAL FIELD OF THE INVENTION

The present invention relates to a foot for optical or photographic supports. The foot is suitable for the construction of monopod or pluripod supports, in particular so-called tripod supports.

TECHNOLOGICAL BACKGROUND OF THE INVENTION

In those supports, the problem arises of permitting simplified positioning of the feet, for example, an extension of various telescopic members with relative locking thereof at the desired extension, without also complicating the closing of the feet in order to put the support back when the work has been completed. It is also desired that the telescopic members be provided with arrangements for relative locking that are suitable for increasing the locking action under load while ensuring easy unlocking when the work has been completed. It is also desired that it should be possible to activate the unlocking operation with a single control operation.

These functions are not all made available at the same time by the supports produced in accordance with the prior art.

For example, it is known to produce feet (otherwise known as legs in pluripod supports) having a pair of elements guided telescopically one inside the other (telescopic members), one of which has locking means of the type in the form of a ring of balls. Locking is effected by expansion of the ring of balls as a result of the relative movement between the balls and a frustoconical expander body.

A first disadvantage of this type of foot is encountered when, as is routine, the telescopic members are produced from a light alloy, for example aluminium alloy. In that case, because the action of the expander body increases under load, that is to say, the force with which the balls are pressed against the inner shell of the telescopic member in question increases in proportion to the load weighing on the foot, conditions may arise in which the radial expansion pressure of the ring is such as significantly to damage the inner shell of the telescopic member against which the balls press. Unlocking is effected by operating a rod which acts on a plate which holds the balls against the expander body. The mechanism is such that it is possible to control only one pair of telescopic members, which limits to an unacceptable extent the height of the foot in the extended condition.

BRIEF SUMMARY OF THE INVENTION

The problem on which the present invention is based is to provide a foot for monopod or pluripod supports which are intended for optical equipment, including specifically photographic and/or cinematographic equipment, which foot is designed structurally and functionally to overcome all of the disadvantages discussed with reference to the mentioned prior art.

This problem is solved by the invention by means of a foot produced in accordance with the claims which follow.

BRIEF DESCRIPTION OF THE DRAWINGS

The features and advantages of the invention will emerge more clearly from the detailed description of a preferred embodiment thereof which is illustrated by way of non-limiting example with reference to the appended drawings in which.

PREFERRED EMBODIMENT OF THE INVENTION

Figure 1:
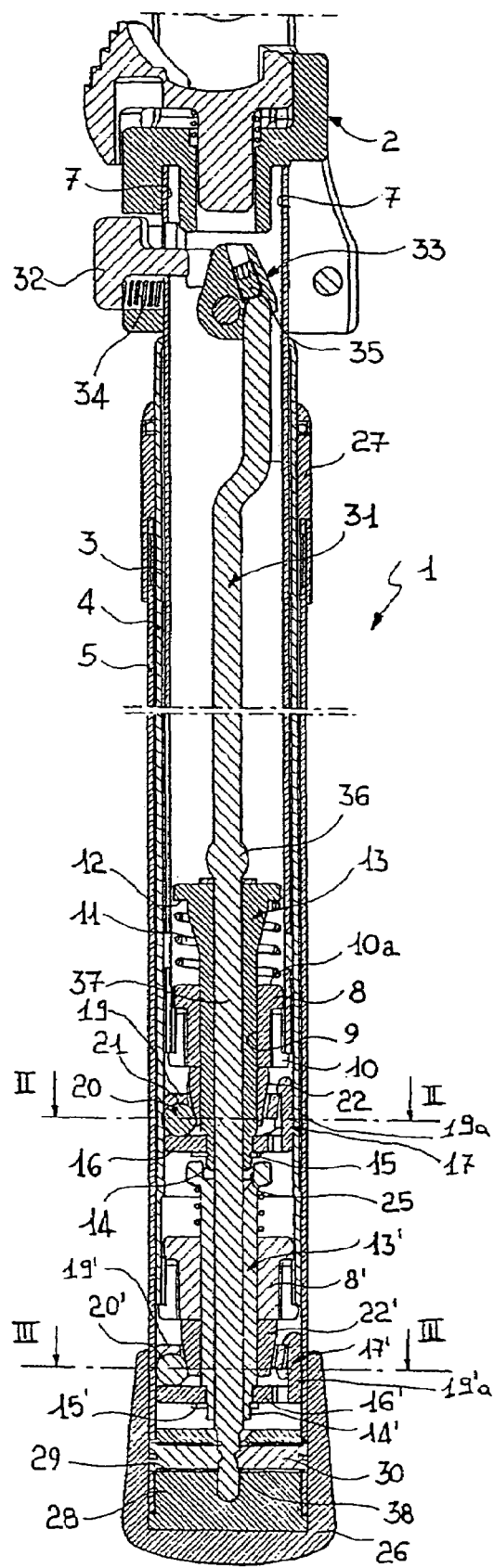
FIG. 1 is a view in longitudinal section of a foot produced in accordance with the present invention.
Figure 2:
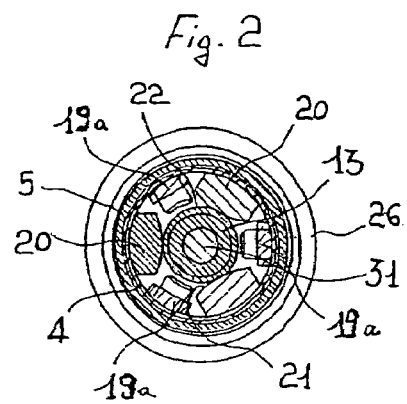
FIGS. 2 and 3 are cross-sectional views taken at the location of the lines II-II and III-III in FIG. 1.
Figure 3:
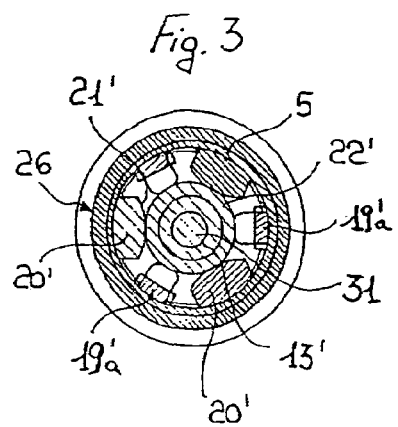

In the drawings, 1 generally indicates a foot having at one axial end a mechanism 2 for articulation to a cross-member or the like (not shown) in order to form a pluripod support, for example a photographic tripod.

The foot 1 comprises three tubular telescopic members 3, 4, 5, of increasing diameter, which are slidably insertable one inside the other in the contracted position of FIG. 1 and which are telescopically extendable one from the other in the required operative extension condition.

The first tubular telescopic member 3, that having the smallest diameter, has one end accommodated in a seat 7 of the mechanism 2 and has, inserted at the opposite end, a stopper 8 which has a central hole 9 and which, with a lip 10 thereof, abuts the free end of the first telescopic member.

At the end opposite the lip 10, the stopper 8 forms an engagement surface 10a for a resilient means, such as a helical spring 11, which in turn acts against a shoulder 12 of a sleeve 13. The sleeve 13 is tubular and extends beyond the free end of the first telescopic member, terminating in an appendage 14 having a ring 15 which holds a plate 16 of a cage 17. The cage 17 comprises a ring 19 to which are coupled legs 19a which extend from the plate 16 and are spaced circumferentially with equal angular spacings.

Supported in the cage 17 is a ring of barrel rollers 20 which are circumferentially equidistant and whose outer shell 21 has a curvature substantially identical to the curvature of the inner shell of the second telescopic member 4. A large radial clearance is present between the rollers, the inner shell of the second telescopic member and the sleeve and is partially occupied by the free end of an expander body in the form of a conical ring 22 which, at the opposite end, abuts the stopper 8 and is capable of being placed between the rollers and the sleeve in the manner explained hereinafter. What has been described thus far constitutes a first expanding stop mechanism for blocking the relative telescoping between the first and second telescopic members, that is to say, between two adjacent telescopic members of a first pair of telescopic members.

The second and third telescopic members also form a pair of telescopic members which are adjacent to one another, and a corresponding second expanding stop mechanism is provided which is substantially analogous to that described above, to the extent that analogous details are indicated by the same reference numerals supplemented by the index ('). The main difference between the first and second stop mechanism resides in the fact that the sleeve 13' has a seat 25 for accommodating the appendage 14 of the first mechanism.

The third telescopic member is closed at one end by a cap 26 and has at the opposite end a dust-protecting means 27 for preventing dust and dirt from entering the inside of the foot 1.

An end plug 28 having a central seat 29 and radial pins 30, of the type having a small resilient ball, is fitted at the end having the cap 26.

A rod-shaped control 31 extending axially in the foot 1 and operable from outside the foot by a push-button 32 by way of an angular guide 33 is provided for the release on command of the first stop mechanism. A spring 34 is used to urge the push-button into a non-stressed state and a threaded grub screw 35 is used to adjust the clearance between the guide and the rod-shaped control.

The rod-shaped control 31 acts on the sleeve 13 by way of an enlarged portion 36, extends through the sleeve with an extension 37 thereof and is capable of snap-engagement in the central seat 29 of the plug 28, being held there by snap-engagement of the radial pins 30 in a circumferential groove 38 when the foot 1 is completely retracted (FIG. 1). In that state, the extension 37 is accommodated in the axial hole of the sleeve 13'.

The operation of the foot 1 is as follows.

Starting from the completely contracted position of FIG. 1, in order to extend the foot it is sufficient to grip the third telescopic member and exert thereon a traction away from the articulation mechanism 2. In the first place, this results in the uncoupling of the snap-connection system of the radial pins 30 in the groove 38, which is used to lock the foot in the retracted position; in the second place the foot 1 is extended with relative sliding of the three telescopic members. It should be noted that the spring 11 exerts a resilient preloading action between the ring of rollers 20 and the expander body 22 sufficient to apply friction to the relative sliding between the telescopic members, so that, once the desired extension of the foot has been adjusted manually, this extension is maintained in the absence of deliberate variations.

The relative sliding between the telescopic members 3, 4, 5 is blocked with a blocking action which increases in proportion to the load applied to the foot. Owing to the resilient preloading applied to the ring of rollers 20 by way of the plate 16, the expander body 22 is initially positioned between the ring of rollers 20 and the sleeve 13. The axial load applied to the foot in the direction of closing the same is consistent with this positioning action generating greater pressure of the rollers against the inner shell of the telescopic member against which they bear. The wall of the telescopic member in question is not, however, damaged, because the curvature of the rollers is substantially equal to that of the telescopic member and contact is distributed over a larger surface. In practice, the contact between the surface of the roller and the surface of the inner shell of the telescopic member is a surface contact instead of a punctiform contact.

This applies analogously to the second stop mechanism.

In order to reclose the foot towards the condition of minimum extension of FIG. 1, the push-button 32 is pressed in such a manner as to pivot the angular guide 33 and to move the rod-shaped control 31 axially. First of all, therefore, an action unlocking the first stop mechanism is exerted because the plate 16 is moved away from the conical ring 22 (expander body) by means of the movement imparted to the sleeve 13 by the enlarged portion 36 in opposition to the spring 11, with a consequent release of the ring of rollers 20. This enables the extension of the first telescopic member relative to the second to be adjusted as far as complete closure.

When the telescopic members are completely retracted one inside the other, the appendage 14 interferes with the sleeve 13' of the second stop mechanism, thus bringing about the unlocking thereof. The operation thereof and the consequent adjustment of the extension between the second and third telescopic members are obtained in a manner analogous to that described in connection with the first stop mechanism.

The invention thus solves the problem posed and obtains numerous advantages over conventional feet, including greater speed of opening and closing the tripod. In addition, simpler adjustment of the length of each single foot is permitted thanks to the positioning of the control push-button in the vicinity of the cross-member.

Furthermore, owing to the fact that locking increases with the load imposed on the foot, a self-locking effect is obtained which avoids the unnecessary and damaging excessive loads brought about by locking mechanisms having a fixed clamping load.

Not least, the invention offers the advantage of not having external members on the stop mechanism. Thus, the mechanism is more protected from the action of atmospheric agents and from jolts, and the undesired possibility that cables or belts (for example of photographic apparatus) may become entangled in external members is also prevented.

The invention claimed is:

1. A foot for optical or photographic supports, including a telescopic rod having several telescopic members and, for each pair of adjacent telescopic members, an expanding stop mechanism mounted on one telescopic member of the pair and acting on the other telescopic member of the pair in order to block their relative sliding motion in a first direction of two directions of relative sliding motion and to release the relative sliding motion in the other of the two directions, and also means for the release on command of the stop mechanism for releasing on command the relative sliding motion in the first direction, the stop mechanism including a radially expandable ring and an expander body for the ring for pressing the elements of the ring radially against an inner shell of the other telescopic member as a consequence of a relative movement between the ring and the expander body, the foot wherein the ring comprises a plurality of barrel rollers having an outer shell with a curvature coinciding substantially with the curvature of the inner shell of the other telescopic member, wherein the stop mechanism comprises a cage acting on the ring of rollers in order to maintain them in a position in which they are spaced circumferentially relative to one another and to hold them in position with respect to the movement of the expander body.

2. The foot for optical or photographic supports according to claim 1, wherein the rollers are equidistant from the cage.

3. The foot for optical or photographic supports according to claim 2, wherein resilient means acting between the ring of rollers and the expander body are provided in order to impose a resilient preloading on the rollers by means of the expander body sufficient to apply friction to the relative sliding between the telescopic members.

4. The foot for optical or photographic supports according to claim 2, wherein the stop mechanism comprises a stopper mounted at one end of an inner telescopic member of the pair, a sleeve capable of sliding in the stopper, resilient means between the stopper and the sleeve tending to return the sleeve into the inner telescopic member of the pair, the expander body including a conical ring capable of being positioned between the rollers and the sleeve as a consequence of the load weighing on the telescopic members in the first direction.

5. The foot for optical or photographic supports according to claim 1, wherein resilient means acting between the ring of rollers and the expander body are provided in order to impose a resilient preloading on the rollers by means of the expander body sufficient to apply friction to the relative sliding between the telescopic members.

6. The foot for optical or photographic supports according to claim 5, wherein the stop mechanism comprises a stopper mounted at one end of an inner telescopic member of the pair, a sleeve capable of sliding in the stopper, resilient means between the stopper and the sleeve tending to return the sleeve into the inner telescopic member of the pair, the expander body including a conical ring capable of being positioned between the rollers and the sleeve as a consequence of the load weighing on the telescopic members in the first direction.

7. The foot for optical or photographic supports according to claim 1, wherein the stop mechanism comprises a stopper mounted at one end of an inner telescopic member of the pair, a sleeve capable of sliding in the stopper, resilient means between the stopper and the sleeve tending to return the sleeve into the inner telescopic member of the pair, the expander body including a conical ring capable of being positioned between the rollers and the sleeve as a consequence of the load weighing on the telescopic members in the first direction.

8. The foot for optical or photographic supports according to claim 7, wherein the cage comprises a plate mounted on the sleeve and subjected to the preloading action of the resilient means in order to press the ring of rollers into engagement with the expander body.

9. The foot for optical or photographic supports according to claim 1, wherein resilient means acting between the ring of rollers and the expander body are provided in order to impose a resilient preloading on the rollers by means of the expander body sufficient to apply friction to the relative sliding between the telescopic members.

10. The foot for optical or photographic supports according to claim 1, wherein the stop mechanism comprises a stopper mounted at one end of an inner telescopic member of the pair, a sleeve capable of sliding in the stopper, resilient means between the stopper and the sleeve tending to return the sleeve into the inner telescopic member of the pair, the expander body including a conical ring capable of being positioned between the rollers and the sleeve as a consequence of the load weighing on the telescopic members in the first direction.

* * * * *